United States Patent
Cox et al.

(10) Patent No.: US 6,538,995 B1
(45) Date of Patent: Mar. 25, 2003

(54) DELAY MINIMIZATION FOR CIRCUIT EMULATION OVER PACKET SWITCHED (ATM) NETWORKS

(75) Inventors: Neil Cox, Burnaby (CA); Kent Bodell, Port Moody (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/091,454

(22) PCT Filed: Dec. 19, 1996

(86) PCT No.: PCT/CA96/00857

§ 371 (c)(1),
(2), (4) Date: Dec. 23, 1998

(87) PCT Pub. No.: WO97/23114

PCT Pub. Date: Jun. 26, 1997

(30) Foreign Application Priority Data

Dec. 19, 1995 (GB) ............................... 9525923

(51) Int. Cl.⁷ ......................... H04L 12/26; H04L 12/56
(52) U.S. Cl. .................................. 370/232; 370/395.43
(58) Field of Search ................................ 370/230, 231, 370/232–235, 395.43, 238, 516–518

(56) References Cited

U.S. PATENT DOCUMENTS

| | | | | |
|---|---|---|---|---|
| 4,759,014 A | * | 7/1988 | Decker et al. ................. | 370/84 |
| 4,961,188 A | * | 10/1990 | Lau ............................ | 370/94.1 |
| 5,204,882 A | * | 4/1993 | Chao et al. ................. | 375/106 |
| 5,396,492 A | * | 3/1995 | Lien ............................ | 370/60 |
| 5,812,618 A | * | 9/1998 | Muntz et al. ................ | 375/372 |
| 5,844,891 A | * | 12/1998 | Cox ............................ | 370/235 |

\* cited by examiner

*Primary Examiner*—Alpus H. Hsu
*Assistant Examiner*—Toan Nguyen
(74) *Attorney, Agent, or Firm*—Marks & Clerk

(57) ABSTRACT

A method of minimizing throughput delay in constant-bit-rate services carried over packet-based networks subject to variable delays, comprises, in one embodiment, the steps of receiving incoming packets in a buffer, reading out bits from the buffer at a clock frequency $f_i$, continually monitoring the buffer fill level $L_i$, determining the maximum fill level $Lmax_j$ over a plurality of successive samples, determining the minimum fill level $Lmin_k$ over a plurality of successive samples, adjusting the clock frequency $f_i$ to cause the maximum fill level $Lmax_j$ to tend toward a target value TargetLmax, and adaptively changing said target value TargetLmax so that the minimum fill level $Lmin_k$ tends toward a predetermined set-point. The rate of change of the target value TargetLmax is significantly slower than the rate of adjustment of clock frequency. The invention can be applied to other types of clock recovery.

11 Claims, 2 Drawing Sheets

DELAY MINIMIZATION FOR CIRCUIT EMULATION OVER PACKET SWITCHED (ATM) NETWORKS

BACKGROUND OF THE INVENTION

1. Field of the Invention

This invention relates to a method of minimizing delay in emulated circuits over packet switched networks.

2. Description of Related Art

Circuit emulation is the process of transporting a constant bit-rate (CBR) telecommunications service, such as T1, over packet switched networks such as asynchronous transfer mode (ATN) networks. The internet is to make the presence of the asynchronous network in the CBR communication path as transparent as possible. In addition to error-free transport of bits the circuit emulation must provide for transport of alarm, signaling and clock synhronization, thereby enabling the CDR service to be regenerated on exit from the asynchronous network in a manner that is fully complaint with pertinent standards.

In a perfect world, ATM cells for circuit emulation would be transmitted into an ATM network at equally-spaced intervals, and each cell would pass quickly through the network with minimal delay. However, one of the advantages of ATM is that it serves a wide variety of applications, many of which have little need for low transit delays. The co-existence of such applications can cause significant variation in the transit delay of cells through the network. Such delays are primarily a result of queues at points of congestion in the network. Whatever their cause, circuit emulation equipment for ATM networks must be designed to tolerate such delay variation.

When constant bit-rate (CBR) services are transported over an ATM network, a compromise must be drawn between tolerance of the cell delay variation (CDV) and the end-to-end delay. In particular, the device that receives ATM cells for circuit emulation applications must contain a buffer which, in the mean state, remains partially filled. Without such a buffer, a delayed cell will lead to starvation, where no data is available for the CBR transmitter. One must thus choose an operating point which maintains sufficient data in the buffer to accommodate CDV while at the same time keeping end-to-end delay at an acceptable level.

There are two other sources of variation in the buffer fill level that must be accommodated. Firstly, the buffer's fill-level plotted as a function of time looks like a saw-tooth because data are inserted into the buffer in cell-sized (53-byte) blocks but are drained from the buffer one bit at a time at a constant bit rate. Secondly, variation in the observed buffer fill level can be introduced by processing jitter, which is variability in the scheduling of buffer processing tasks caused by the sequencing and relative prioritization of other tasks performed by equipment within the network. Such processing jitter in the transmitting entity can cause variation in the time spacing between transmitted cells, which manifests itself as buffer fill-level variation in the receiving entity. Such processing jitter within the receiving entity can cause an apparent additional fill-level variation by introducing aperiodicity in the buffer management process.

The two additional sources of buffer fill-level variation are generally less problematic than CDV. Processing jitter is under the control of the system designer and can be reduced to a manageable level by proper design, and the "saw-tooth" effects can be minimized by roughly synchronizing the sampling of the buffer's fill-level with the arrival of ATM cells.

The standard approach for accommodating CDV in circuit emulation equipment is to choose a fixed target mean buffer fill level in the entity that receives ATM cells from the network. This target mean buffer fill level is chosen to accommodate the anticipated worst-case variation in buffer fill level, i.e., the target must be high enough to prevent the buffer from ever being emptied when cells encounter worse-case delays. This approach is unduly conservative if the preconceived notion of worst-case delay is too high, and more delay is introduced than is actually needed for safe system operation.

SUMMARY OF THE INVENTION

An object of the present invention is to provide an improved means of trading off throughput delay for tolerance of cell-delay variation (CDV) in circuit emulation over ATM Networks.

According to the present invention there is provided a method of minimizing throughput delay in constant-bit-rate services carried over packet-based networks subject to variable delays, comprising the steps of receiving incoming packets in a buffer, reading out bits from the buffer at a clock frequency $f_i$, continually monitoring the buffer fill level $L_i$, determining the minimum fill level $Lmin_k$ over a plurality k of successive samples, and adjusting the clock frequency $f_i$ to cause the minimum fill level $Lmin_k$ to tend toward a predetermined set-point TargetLmin.

In one embodiment, the clock frequency is adjusted by causing the maximum fill level $Lmax_j$ of the buffer to tend toward a target value TargetLmax, and adaptively changing said target value TargetLmax so that the minimum fill level $Lmin_k$ tends toward said predetermined set-point, the rate of change of the target value TargetLmax being significantly slower than the rate of adjustment of clock frequency.

The invention obviates the need for identifying a fixed safe operating point, and automatically moves to a lower-delay operating point when the network's performance indicates that it is possible to do so. In particular, the prior art method is to choose a fixed mean buffer fill level. This method makes an implicit assumption that excursion of the buffer fill level about its mean very rarely exceeds this chosen set-point. To achieve this, one generally has an intuitive notion as to the size of the worst-case excursion and then chooses a set-point that accommodates such an excursion. The invention is different in that it monitors the minimum buffer fill level rather than the mean. It is thus no longer necessary to make assumptions about the worst-case excursion. This means that the system gravitates towards a lower-delay operating point when it possible to do so, i.e., when the preconceived estimate of the worst-case excursion is unduly pessimistic.

The invention also provides an apparatus for providing constant-bit-rate services in packet-based networks subject to variable delays with minimum throughput delay, comprising a buffer for receiving incoming packets in a buffer, means reading out bits from the buffer at a clock frequency fj, means for continually monitoring the buffer fill level Li, means for determining the minimum fill level $Lmin_k$ over a plurality of successive samples, and means for adjusting the clock frequency fj to cause the minimum fill level $Lmin_k$ to tend toward a setpoint TargetLmin.

BRIEF DESCRIPTION OF THE DRAWINGS

The invention will now be described in more detail, by way of example only, with reference to the accompanying drawing in which.

DETAILED DESCRIPTION OF THE PREFERRED EMBODIMENTS

The invention will be described in the context of its use with cell-based clock recovery. A patent application (PCT/CA95/00320) for a cell-based clock recovery device was recently applied for by Newbridge Networks Corporation, the contents of which are herein incorporated by reference, It should be noted, however, that the present invention does not require cell-based clock recovery to work. The skilled person in the art will recognize that the invention can be used when other methods of clock recovery are active.

Figure 1:
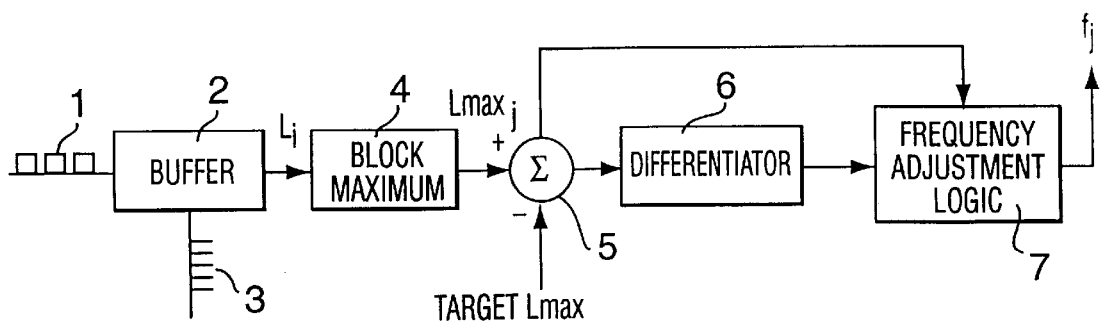
FIG. 1 is a top-level block diagram of a cell-based clock recovery device.

In FIG. 1, which is a top-level block diagram of the cell-based clock recovery device, incoming 53-byte cells 1 arrive at buffer 2, which outputs a constant rate bit stream 3.

Samples $L_i$ of the buffer fill level are fed to block 4, which derives $Lmax_j$, which is the maximum of a predetermined number of successive samples of $L_i$. $Lmax_j$ is fed to subtractor 5, which has as its other input a target buffer level TargetLmax. The outputs of subtractor 5 are passed to differentiator 6 and frequency adjustment logic unit 7 to derive the derived clock $f_j$ frequency as described in our co-pending application referred to above.

The essence of the arrangement described is that it adjusts $f_j$ such that the average of $Lmax_j$ equals the TargetLmax.

Figure 2:
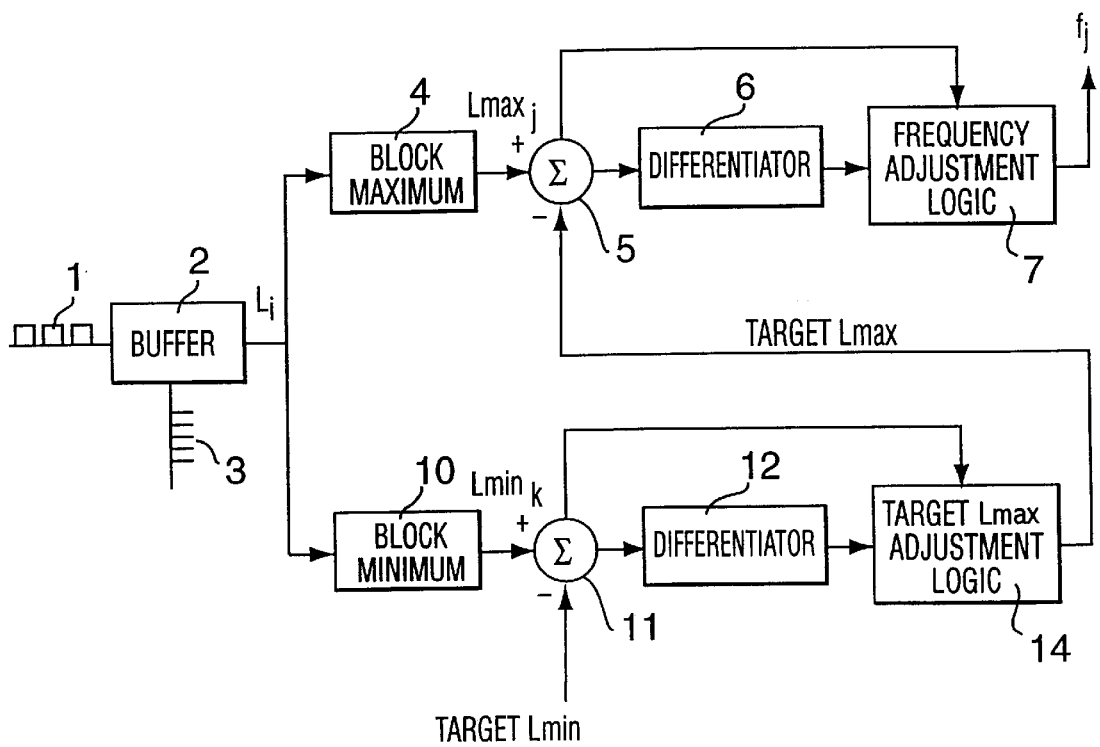
FIG. 2 is a block diagram of a cell-based clock recovery device operating in accordance with the invention

FIG. 2 shows a system in accordance with the invention. It essentially provides a means for adapting the TargetLmax in FIG. 1, such that a lower-delay operating point will in general be obtained.

The procedure for adapting the TargetLmax is similar to the procedure for adapting $f_j$ in CBCR, except that block minima are processed rather than block maxima. It should be noted that the block-size for deriving the $Lmax_j$ is not necessarily the same as the block-size for deriving $Lmin_k$, hence the use of different subscripts.

In FIG. 2, the samples $L_i$ are also fed to block minimum unit 10, which derives $Lmin_k$ representing the minimum buffer fill level over k cells. This is fed to a second subtractor 11, whose second input is TargetLmin, which is a chosen set-point for the minimum buffer fill level. The output of the subtractor 11 is fed to a differentiator 12 and TargetLmax adjustment logic unit 14. This produces an output TargetLmax, which is fed to the minus input of the subtractor 5 in a similar manner to FIG. 1. Unlike the circuit shown in FIG. 1, where TargetLmax is constant, in FIG. 2, TargetLMax is adaptively varied so that the buffer fill level tends to be maintained at the target level TargetLmin.

Figure 3:
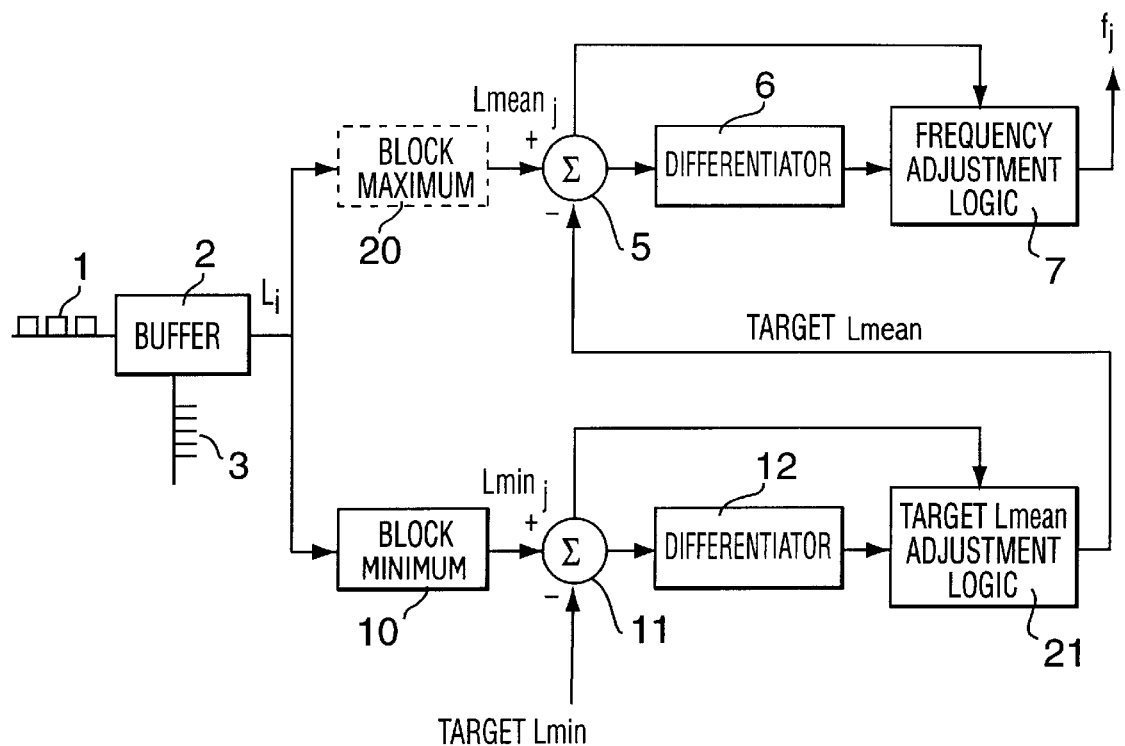
FIG. 3 is a block diagram of a cell-based clock recovery device operating in accordance with the invention employing a more traditional approach to CBCR.

FIG. 3 illustrates how the invention interworks with an embodiment of the more traditional approach to CBCR. In FIG. 3, the maximum block 4 of FIG. 1 has been replaced by a mean block 20, which produces a signal $Lmean_j$, which is the mean of a block of buffer j fill-level samples. $Lmean_j$ is used to drive the clock adjustment instead of $Lmax_j$ as in FIG. 1. The block minimum processor 10 is used to dynamically adjust the TargetLmean in TargetLmean adjustment logic unit 21, which works in a similar manner to TargetLmax logic unit 21 in FIG. 2.

The mean block 20 in FIG. 3 is shown in broken lines to indicate that it is not essential to the CBCR process, as the equivalent function can be performed as part of the frequency adjustment logic. However, in many cases it is simpler from an implementation perspective to apply a block mean as indicated. Again, the block-size for deriving $Lmin_k$ need not be the same as the block size for deriving $Lmean_j$.

Figure 4:
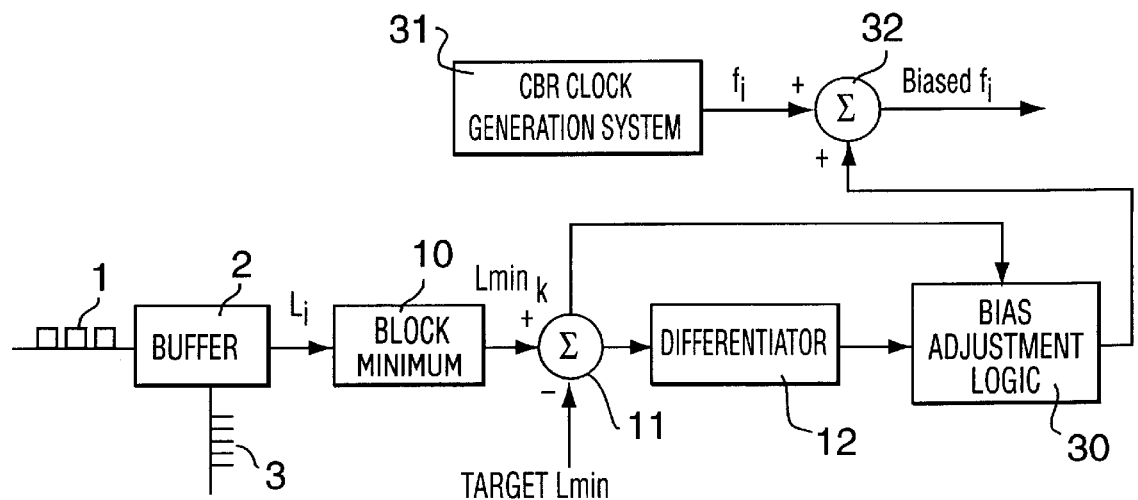
FIG. 4 is a more general block diagram of a device working with a clock generator for an emulated CBR service.

FIG. 4 illustrates how the invention interworks in general with clock generation for anemulated CBR service. Some means for establishing a suitable clock frequency $f_i$ is always provided as part of the CBR circuit emulation process. In FIG. 4, this is shown as the CBR clock generation system 31.

The invention introduces a bias in the derived clock $f_i$ such that, in general, a lower end-to-end delay is achieved. In particular, the CBR clock ($f_i$) is increased when the recent history of block minima indicates that the delay is unnecessarily high, and the CBR clock ($f_i$) is decreased when the recent history of block minima indicates that the delay is dangerously low. This is achieved in adder 32, which has as one input $Lmin_k$ and as its other input the output of bias adjustment logic unit 30, which generates an output signal from setpoint TargetLmin and $Lmin_k$ as described with reference to FIG. 2.

When choosing the set-point for the buffer fill level, one must leave a margin of safety to allow for instances where the delay within the network suddenly increases. Such an increase in delay causes a drop in the minimum buffer fill level and can thus lead to starvation if the safety margin is not large enough.

For two reasons, the adaptation rate for delay minimization must be significantly slower than the adaptation rate for adjusting the clock frequency in CBCR. The first reason is that the minimum buffer fill level (which is used for delay minimization) generally has a high variance relative to the either mean buffer fill level or the maximum fill level (which are used for frequency adjustment). The adaptation must thus be much slower in order to avoid undue extra jitter and wander in the output clock. The second reason is to avoid complicated interaction between the adapted parameters. The CBCR adaptation operates on the assumption that the TargetLmax is approximately constant, and the delay minimization adaptation operates on the assumption that its adjustments of the TargetLmax are reasonably quickly reflected as changes to the buffer fill level samples ($L_i$). These assumptions are only reasonable if the delay minimization adaptation is much slower than the CBCR adaptation.

Slow adjustment of the CBCR target, such as is described here for delay minimization, necessarily appears as slow variation in the derived clock frequency, i.e., wander. This will be a concern for networks designed under the assumption that wander is controlled. Operators of such networks may wish to sue the adapt-and-freeze method mentioned to keep wander under tight control.

In such networks, the invention can be used as a self-calibration process when a CBR service is installed. The delay minimization will be active on system start-up but after, say, one day it can automatically be turned off so that wander is brought under better control.

While the invention attempts to adapt to changes in the minimum buffer fill level, it is prudent to build in mechanisms for overriding the adaptation process and moving quickly to a safer set-point when the minimum fill-level gets dangerously low. It is also prudent to allow the invention to be disabled in favor of the traditional approach of having a fixed mean buffer fill level as a target operating point.

What is claimed is:

1. A method of minimizing throughput delay in constant-bit-rate services carried over packet-based networks subject to variable delays, comprising the steps of;

receiving incoming packets in a buffer;

establishing a target minimum fill level set-point for said buffer, reading out bits from the buffer at a clock frequency $f_j$;

continually monitoring the buffer fill level $L_i$;

continually establishing the value of said minimum fill level of said buffer over k successive samples for successive blocks of k successive samples;

identifying a second buffer fill level characteristic describing an aggregate property of said buffer over j successive samples, where j and k can be the same or different, and affecting the minimum fill level of said buffer;

continually establishing the value of said second buffer fill level characteristic for successive blocks of j successive samples;

establishing a target value for said second fill level characteristic;

adaptively varying said target value for said second fill level characteristic so as to cause the minimum buffer fill level to approach said target minimum fill level set-point; and continually adjusting said clock frequency $f_j$ so that said second fill level characteristic approaches said adaptively varied target value for said second fill level characteristic, said target value for said second fill level characteristic being varied at a rate that is significantly lower than the rate of adjustment of said clock frequency.

2. A method as claimed in claim 1, wherein the clock frequency $f_j$ is adjusted by causing a maximum fill of the buffer to approach said adaptively varied target value for the maximum buffer fill level.

3. A method as claimed in claim 1, wherein said second buffer fill level characteristic is a mean buffer fill level, and the clock frequency $f_j$ is adjusted by causing the mean fill level of said buffer to approach said adaptively varied target value for the mean buffer fill level.

4. A method as claimed in claim 1, wherein the adaptive changing of clock frequency $f_j$ is used as a self-calibration process and then discontinued after a period of time.

5. A method as claimed in claim 2, wherein the rate of change of said adaptively varied target value is sufficiently slow that said adaptively varied target value appears constant to the clock frequency adjustment circuitry.

6. A method as claimed in claim 1, wherein said packet-based network is an ATM network and said packets are ATM cells.

7. An apparatus for providing constant-bit-rate services in packet-based networks subject to variable delays with minimum throughput delay, comprising;

a buffer for receiving incoming packets in a buffer;

means for reading out bits from the buffer at a clock frequency $f_j$;

means for continually monitoring the buffer fill level $L_i$;

means for continually establishing the value of the minimum fill of said buffer over k successive samples for successive blocks of k successive samples;

means for establishing the value of a second fill level characteristic for successive blocks of j successive samples, where j and k can be the same or different, said second fill level characteristic describing an aggregate property of said buffer over j successive samples and affecting the minimum fill level of said buffer;

means for establishing a target value for said second buffer fill level characteristic;

means for adaptively varying said target value for said second buffer fill level characteristic to cause said minimum buffer fill level to approach a predetermined buffer minimum fill level target set-point;

means for adjusting the clock frequency $f_j$ to cause the second buffer fill level characteristic to approach said adaptively varied target value; and said means for adaptively varying said target value for said second buffer fill level characteristic varying said target value for said second fill level characteristic at a rate that is significantly lower than the rate of adjustment of said clock frequency.

8. An apparatus as claimed in claim 7, wherein said second buffer fill level characteristic is the maximum buffer fill level $Lmax_j$ over a block of j successive samples.

9. An apparatus as claimed in claim 7, wherein said second buffer fill level characteristic is the mean buffer fill level $Lmean_k$ over a block of j successive samples.

10. An apparatus as claimed in claim 8, wherein said means for adaptively changing said clock frequency $f_j$ comprises a subtractor for determining the difference between said set-point and said minimum fill level, a differentiator for differentiating said difference, and an adjustment logic unit responsive to the output of said subtractor and said differentiator.

11. An apparatus as claimed in claim 7, wherein said network is an ATM network and said packets are ATM cells.

* * * * *